United States Patent [19]
Suter

[11] 3,740,704
[45] June 19, 1973

[54] SONIC DETECTION METHOD AND APPARATUS

[75] Inventor: Henry Suter, Hatboro, Pa.

[73] Assignee: The United States of America as represented by the Secretary of the Navy.

[22] Filed: Oct. 28, 1968

[21] Appl. No.: 772,068

[52] U.S. Cl. ............................ 340/3 D, 340/258 A
[51] Int. Cl. ............................................. G01s 9/66
[58] Field of Search ............ 340/1, 3, 3 D, 258 A; 343/5 PD

[56] References Cited
UNITED STATES PATENTS
3,121,856 2/1964 Finney .................................... 340/3
3,383,678 5/1968 Palmer.................................... 343/5

*Primary Examiner*—Richard A. Farley
*Attorney*—E. J. Brower, H. Hansen and B. F. Buchan, Jr.

[57] ABSTRACT

A sonic detection system installed adjacent the upstream side of a bridge for detecting and indicating the intrusion of swimmers into an adjacent guarded volume of water. The system utilizes the interference signal attributable to multiple signal reflection paths and Doppler frequency shifts therein to enable the detection of both swimmers floating with the primary current and those moving relative to the primary current. The system includes a directional, continuous wave sound projector and a matched directional receiver which are submerged and are arranged in spaced relation normally of the primary current to have their beam pattern axes intersect at a point upstream of the bridge for establishing the guarded volume. Fixed filters and an adjustable filter are included along with a display which is adjustable for the prevailing ambient conditions to provide indications that the overall response and/or certain received signal frequency spectra have increased above generally randomly varying ambient levels.

19 Claims, 6 Drawing Figures

PATENTED JUN 19 1973 3,740,704

INVENTOR.
HENRY SUTER

BY
ATTORNEYS

Fig. 6

SONIC DETECTION METHOD AND APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

In general, this invention pertains to underwater detection systems and, more particularly, to a continuous wave, Doppler sonar system.

The threat of destruction of harbors, bridges, floating barracks and the like by underwater attackers demands a high degree of constant surveillance by security personnel. The effective degree of surveillance is substantially reduced by the difficulty of positively detecting the approach of underwater attackers particularly at night or during rainstorms. Conventionally used defenses such as nets, fences and the like are vulnerable to penetration. The use of conventional sonar apparatus is ineffective in that, since fixed objects such as rocks or extraneous reflecting surfaces appear as false targets, continuous observation of the conventional sonar display by trained observers is required to separate moving targets from the false targets, in that the cost of such apparatus can be very great and in that such apparatus is ineffective in the environment of a relatively shallow stream having a current on the order of one-half to one knot and the associated turbulence and discontinuities.

SUMMARY OF THE INVENTION

It is the general purpose of this invention to provide a simple, portable, low cost sonic detection system which is easily adapted to provide an automatic alarm and which can be used by unskilled personnel as an aid in maintaining a constant, effective surveillance which protects installations accessible by water from enemy attack. Briefly, the general purpose of the invention may be accomplished by providing a continuous wave sonar system including a directional acoustic signal projector and a directional receiver arranged in spaced relation adjacent the upstream side of the installation with intersecting beam patterns establishing a guarded volume of water spaced from the projector and receiver and including a signal processor continuously monitoring the complex signal received while continually ensonifying the guarded volume, which signal processor has adjustable and fixed filters and display means for indicating increases above ambient levels of the received signal and selected frequency spectra thereof.

DESCRIPTION OF THE PREFERRED EMBODIMENT

In general, the system mode of operation contemplates that a continuous wave acoustic signal including Doppler shifted signal spectra attributable to relatively moving reflective objects be processed as by filters to obtain indications of amplitude increases above ambient levels of certain Doppler frequency spectra. Such increases of certain selected Doppler spectra are used to indicate the intrusion of floating or swimming underwater attackers into a guarded volume of water.

Figure 1:
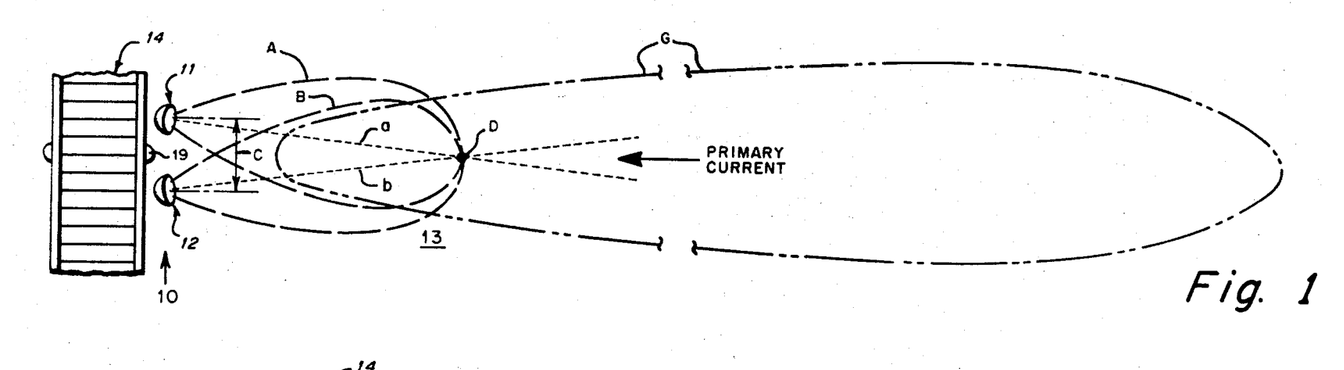
FIG. 1 represents a plan view of a portion of a stream and a bridge having deployed adjacent thereto a sonic detection system according to the invention.

Referring now to FIG. 1, the system generally includes a transducer array 10 having a directional, single tone, continuous wave acoustic signal projector 11 and a directional acoustic signal receiver 12. More particularly, the projector 11 and the receiver 12 are submerged in a stream 13 in spaced relation to each other and in fixed relation to the stream bottom on the upstream side of a water accessible installation such as a bridge 14. The projector 11 and receiver 12 generally include matched spherical transducers, such as 15 of FIG. 2, which are fixedly mounted at the foci of circular paraboloid reflectors, such as 17 of FIG. 2, which are each conveniently made of an aluminum dish internally coated with sound reflecting material such as "Corprene" comprising bonded-together cork particles. The coating is configured to form a concave parabolic acoustic signal reflecting interface. The specific shape of the paraboloid is determined by the desired directional beam pattern such as A and B having respective axes $a$ and $b$ for the projector 11 and receiver 12. One suitable narrow-beam pattern for the projector and receiver beams A and B is one which is down 3 db at ± 8.5° relative to the beam axis, down 10 db at ± 15°, down 20 db at ± 20° and down 40 db at ± 25°, all side lobes being reduced to a minimum.

For design purposes it is postulated that underwater attackers will most probably attempt to float or drift down with the stream current to a supporting structure of the bridge 14 such as a piling 19 and affix explosives thereto for destroying the bridge 14. Therefore, the projector 11 and the receiver 12 are symmetrically spaced apart a distance C on respective sides of the piling 19 along a line extending generally normal to the anticipated direction of the primary current of the stream 13, the axes $a$ and $b$ of the narrow-beam patterns A and B generally intersecting at a position D arranged on the perpendicular bisector of the spacing distance C and upstream from the piling 19. Since the projector 11 continually ensonifies the upstream area with the continuous wave carrier signal of a selected frequency, the specifically arranged beam patterns A and B of the projector 11 and receiver 12 form a guarded volume G of generally elongated shape which extends across the anticipated paths which an underwater attacker might use in approaching the bridge 14 to destroy the piling 10.

More particularly, the beam axis intersection D is arranged a sufficient distance upstream such as 50 to 60 feet for a prevailing primary stream current of one knot to ensure that an intruding underwater swimmer can be detected in sufficient time for appropriate countermeasures to be taken. If the spacing C between the receiver 12 and the projector 11 is too small and if the beam patterns axes *a* and *b* intersect at too large an angle, i.e., much greater than 20° to 30°, it has been observed that a Doppler signal of substantial amplitude most probably attributable to the reflections from the adjacent moving water and discontinuities therein affects an impermissably low signal-to-noise ratio. Additionally, if the projector 11 and receiver 12 are arranged too close to each other, more energy is reflected which includes Doppler shifted signals caused by back scattering from the adjacent water surface and nearby discontinuities. By spacing the projector 11 from the receiver 12 at distances such as at least 10 feet or greater and by using narrow, directional beam patterns such as that described, the portions of the received signal attributable to reflections from the adjacent portions of the water surfaces are attenuated a sufficient degree to reduce the amplitude of such ambient Doppler shifted spectra to acceptably low levels permitting detection of intruding targets.

For example, one suitable configuration includes a projector-receiver spacing C of 10 feet with the beam axes *a* and *b* being deflected therefrom at angles of 85° to intersect at the point D located about 57 feet away from the piling 19. In this way, even though the guarded volume G has a relatively narrow width, the Doppler shift in the received signal attributable to the moving water very closely approximates the DOppler shift which would occur if the projector 11 and receiver 12 were both located at the piling 19. More importantly, the range of the described array 10 extends upstream a great distance such as 800 feet for quiet water and 300 or 400 feet for a stream 13 having a primary current of about one knot. Another suitable configuration includes a projector-receiver spacing C which is equal to 50 feet, the beam axes, *a* and *b*, being deflected therefrom at 80° angles to intersect at the point D located about 142 feet from the piling 19. Where a long span is to be protected, the arrays 10 of several detection systems can be utilized to preferably establish contiguous guarded volumes, one array 10 being positioned adjacent at least each support.

Figure 2:
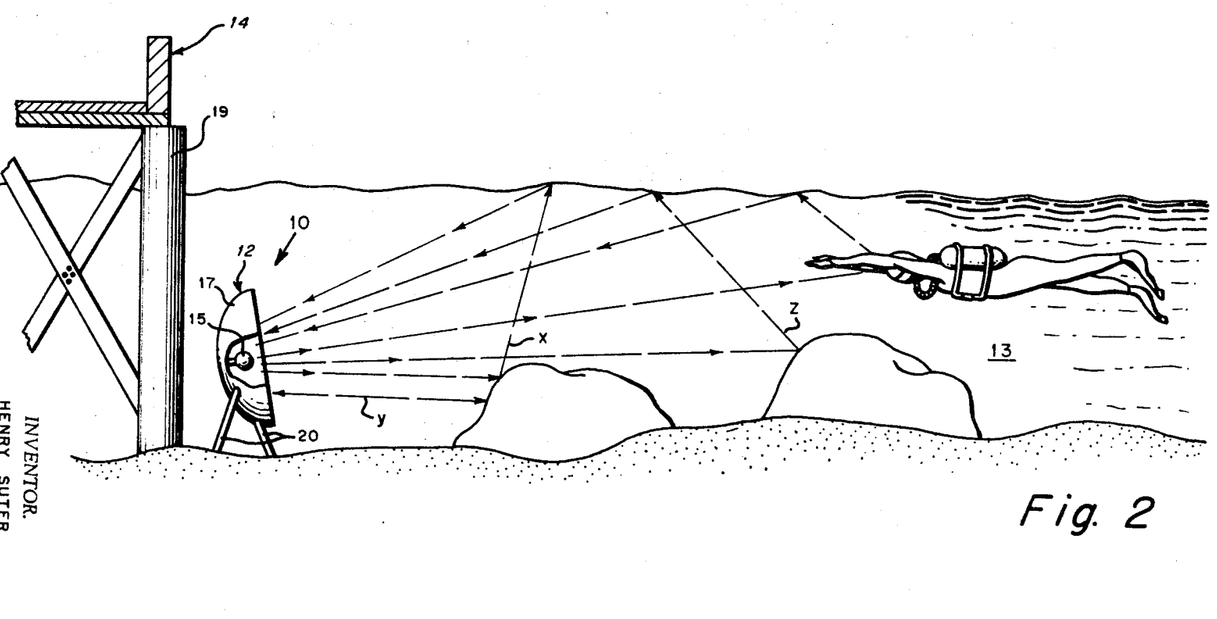
FIG. 2 represents a view in elevation of the stream of FIG. 1 superimposed with multiple ray paths of signal transmission occurring during system operation.

Referring to FIG. 2, it is seen that the projector 11 and receiver 12 are mounted on tripod stands such as 20 which are fixed to the bottom of the stream 13. A spacing reference comprising a plurality of end-to-end linked, rectangular aluminum panels, the end panels being scored with an appropriately arranged beam deflection reference line, can be used to facilitate precise positioning and orientation of the projector 11 and the receiver 12. It is generally desired that the projector 11 and the receiver 12 be located near the bottom below the elevation of the anticipated paths of approaching underwater swimmers so that the beams can look generally upwardly at a slight incline toward the moving target to be detected. However, it has been discovered that the character of the bottom of the stream 13 effects the operation of the detection system in that rocky bottoms tend to directly reflect more energy to the receiver 12 than do sandy bottoms. Therefore, it may be necessary to position the projector 11 and the receiver 12 further above rocky stream bottoms in order to reduce the amplitude of unwanted ambient Doppler shift spectra.

Figure 3:
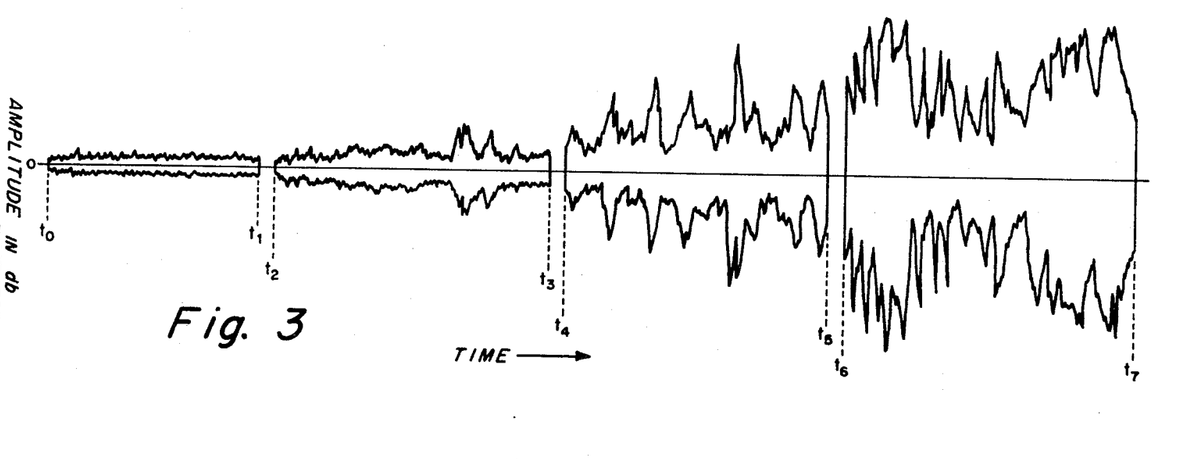
FIG. 3 represents a mechanical recording of time segments of the amplitude envelope of a complex acoustic interference signal received by the detection system.
Figure 4:
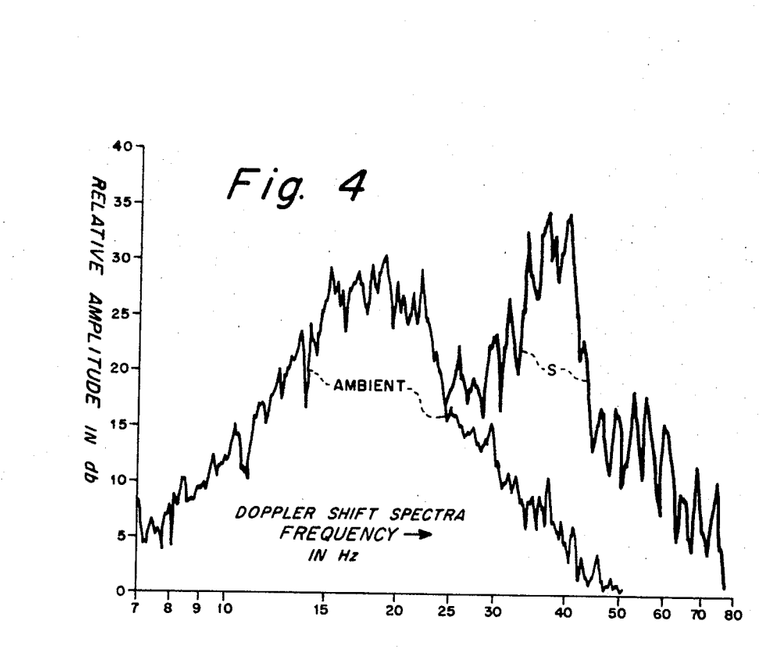
FIGS. 4 and 5 represent wave analyzer recordings of the relative amplitudes of various Doppler shift spectra frequencies processed from a received acoustic interference signal.
Figure 5:
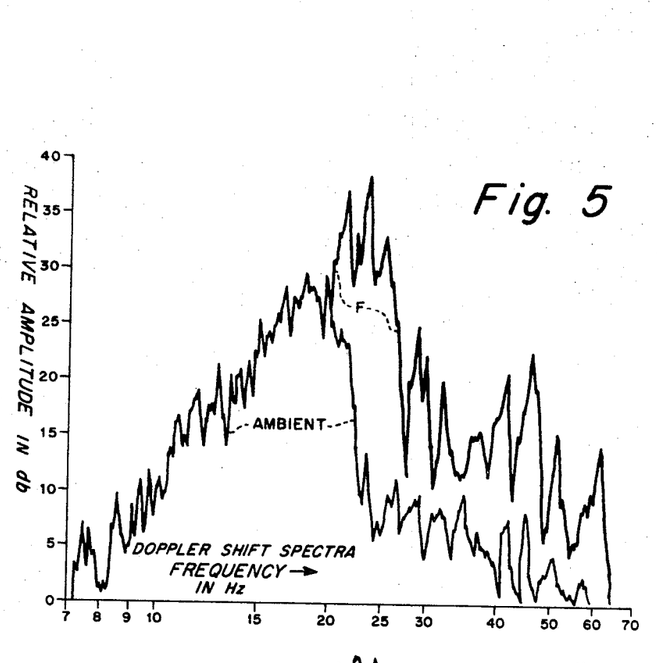

In order to enhance understanding of the detection system, FIGS. 3, 4 and 5 are provided to illustrate both the type of interference signal being received and certain examples of frequency spectra amplitude increases which provide a basis for detecting both floating swimmers and those which are moving relative to the primary stream current.

FIG. 3 represents the envelope of a mechanical amplitude-time recording of the complex acoustic interference signal received during several successive time segments in which an intruding underwater swimmer is approaching the transducer array 10 through still water. The first time segment $t_0 - t_1$ of the recording of FIG. 3 generally discloses the received signal during ambient conditions before the underwater swimmer enters the guarded volume. It is to be noted that the amplitude of the received signal generally has a random variation occasionally interspersed with sharp spikes. The random variation in the signal amplitude is thought to be attributable to the ever-changing geometry of the multitide of ray paths of acoustic signal transmission and reflection. Since, as shown by the paths *x*, *y* and *z* in FIG. 2, the projected carrier signal is reflected from the water surface and from a multitude of fixed objects located at varying distances on or adjacent the bottom of the stream 13, the reflections from the several fixed objects may each differ in phase. As surface wavelets constantly change the ray path lengths, changing phase differences in the multipath reflections collectively cause randomly occurring cancelation or reinforcement of the projected carrier signal. During the time segment $t_2 - t_3$, a swimmer entered the guarded volume G at a range of about 360 feet as is generally indicated by the generally increased average amplitude of the complex signal being received. The range of the swimmer during the time segment $t_4 - t_5$ is about 220 feet and during time segment $t_6 - t_7$ is about 160 feet.

One explanation for the increase in signal level is that the swimmer substantially increases the effective target strength of the overall ensonified area. Consequently, detecting a substantial increase in the received signal level over a five or 10 second period definitely indicates at least in the case of still water that an intrusion into the guarded volume G is occurring, there being a reasonably low probability of false alarm. However, in the environment of a stream having a current and associated turbulence, the ambient received signal includes a substantial proportion of Doppler-shifted spectra most probably attributable to reflections from the moving water and discontinuities therein, from objects suspended or floating therein and from surface waves which substantially bury the increases in signal intensity attributable to an intruding swimmer particularly at ranges beyond 300 or 400 feet.

FIGS. 4 and 5 represent mechanical recordings by a wave analyzer of the relative amplitudes of detected Doppler shift spectra in reflections of a 30 KHz carrier signal received under conditions of a one-knot primary stream current. Ampitude increases in Dooppler shift spectra represented by curves S and F are superimposed upon the ambient spectra for a first case wherein an underwater swimmer is swimming downstream at a speed of about one knot relative to the one-knot current and for a second case wherein an underwater swimmer is floating or drifting with the one-knot current. Since a target moving at a speed of about one knot will introduce about a 20 HZ Doppler shift into the reflection of a 30 KHz carrier signal, Doppler shift spectra of the greatest relative amplitude in the detected spectra of the ambient received signal are observable as occurring at about 20 Hz which corresponds to the velocity of the primary current. Observable Doppler shift spectra of frequencies less than 20 Hz are thought to be attributable to the vertical velocity profile of the stream wherein water adjacent the bottom is moving much more slowly than water adjacent the surface thereof. Because the swimmer in the example of FIG. 4 is proceeding at a speed greater than that of the water, Doppler shift spectra of substantially increased amplitude on the order of 20 to 30 db are observable in curve S as peaking at a frequency of about 37 – 40 Hz indicating a Doppler velocity of about two knots. The increased amplitudes of these spectra are thought to be primarily attributable to reflections from the chest cavity and head of the swimmer. The increased amplitudes on the order of 15 to 20 db of spectra of higher frequencies in the region of 50 to 73 Hz are thought to be attributable to the movement of the arms and legs of the swimmer.

The curve F of FIG. 5 for the floating or drifting swimmer case illustrates that the maximum spectra amplitude and the most marked increases on the order of 20 to 30 db in spectra amplitudes are observable at frequencies of 22 to 26 Hz which is only slightly greater than the 20 Hz spectra attributable to the primary stream current.

The slight difference in the frequencies of the peaked spectra is thought to be attributable to slight, virtually unintentional movement of the arms and legs of the drifting swimmer which are necessarily undertaken in order to maintain a relatively constant orientation in the stream 13. Such movements additionally offer one explanation for the distribution of Doppler shift spectra of increased amplitude in the region of 40 to 50 Hz.

Figure 6:
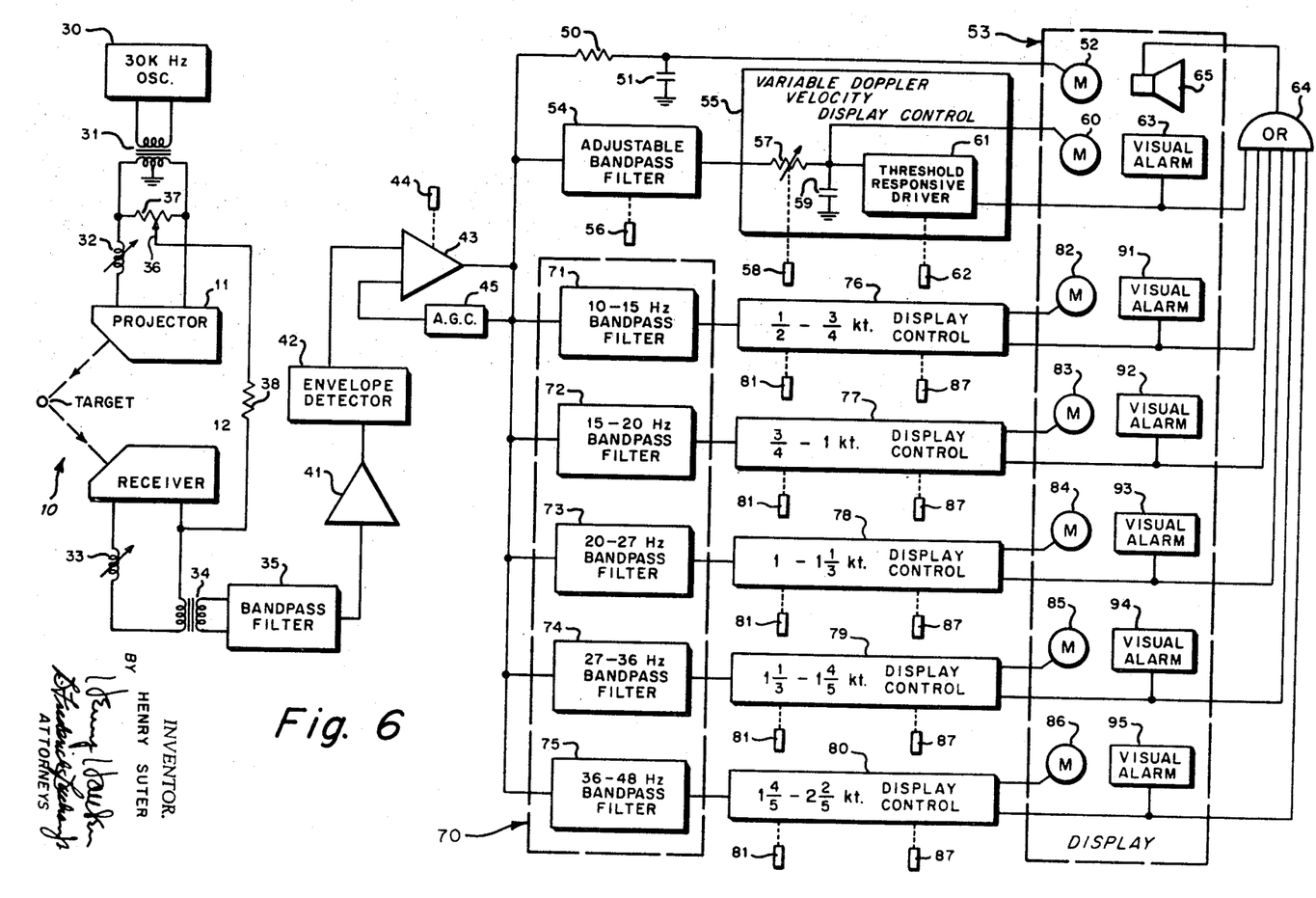
FIG. 6 represents a block and schematic diagram of the sonic detection system according to the invention.

Referring now to FIG. 6, the detection system further includes a 30 KHz oscillator 30 for providing for projection the single-tone carrier signal. The signal is coupled through a transformer 31 having a center tapped secondary and is applied through a conventional impedance matching tuning coil 32 across the transducer of the projector 11.

Some care must be given toward the selection of the frequency of the continuous wave, single-tone carrier signal to be utilized in the detection system. For example, it is preferred that the continuous wave signal have a single-tone frequency which lies in a range above that audible by human beings. However, if the frequency of the signal is too great such as above 150 KHz, the range of the system becomes markedly attenuated for systems of relatively low power thereby impairing its utility because, for example, of the reduced warning time for stimulating the undertaking of appropriate countermeasures. Additionally, if the signal frequency is too large such as in the range of 150 KHZ commonly used in fish detecting systems, smaller nearby objects on the order of the size of small fish are detected by the system and contribute a substantial amount of unwanted Doppler noise. One satisfactory frequency for the system carrier signal which has been found useful in attaining ranges of about 800 feet in still water and 300 to 400 feet in moving water is 30 KHz.

It has been ascertained that underwater swimmers find it difficult to perform underwater work such as attaching explosives when the current is much greater than one knot. Further, sustained speeds by underwater swimmers excessive of one knot relative to the water are unusual, particularly when long distances must be traversed. In view of the relatively small Doppler velocities contemplated, the costs of filters included in the signal processor hereinafter described are also factors to be considered in selecting the appropriate carrier frequency.

The receiver 12 continuously receives the complex interference signal reflected from the guarded volume G. The output signal of the transducer is applied through a second impedance matching tuning coil 33 and through a coupling transformer 34 to a bandpass filter 35. The bandpass filter is of the type having a center frequency of 30 KHz substantially equal to that of the carrier signal and the bandwidth of about 200 Hz to that the Doppler-shifted signal spectra reflected from moving targets may be processed.

In order to provide a reference signal, an attenuated sample of the carrier signal appearing at the wiper arm 36 of a potentiometer 37 is applied through a resistor 38 for addition to the received signal being applied across the primary of the transformer 34. It has been discovered that this configuration eliminates second harmonics of the detected ambient Doppler shift spectra thought to be caused by overmodulation of the directly reflected carrier signal with Doppler-shifted signals.

The output signal provided by the filter 35 is amplified by a broad bandpass amplifier 41 and is applied to an envelope detector 42 which, in effect removes the carrier signal and supplies a detector output signal including the Doppler shift spectra introduced by reflective targets moving within the guarded volume G. The detector ouput signal is applied to a broad bandpass, variable gain controlled amplifier 43 whose output signal amplitude may be adjusted to a selected level as by turning a knob 44. The apparatus also includes an automatic gain control loop 45 for adjusting the gain of the amplifier 43 to compensate for shifts in the average ambient level of the output signal of the detector 42 over long periods of time such as 10 to 15 minutes, It is preferred that the amplifiers 41 and 43 have substantially flat responses in the region of 5 to 50 Hz particularly for installations where the stream current is as low as one-fourth knot.

The gain controlled output signal of the amplifier 43 is applied through a resistor 50 and across a charging capacitor 51 to a meter 52 arranged in a display generally represented at 53 which indicates the overall signal level of the amplified detector output signal including in composite Doppler shift spectra of interest. It is preferred that the capacitor 51 have such a value that the signal is, in effect, integrated over a period such as 1 to 5 seconds so that spurious signal level increases are not displayed. The output signal of the amplifier 43 is also applied through an adjustable narrow bandpass filter 54 to a variable Doppler velocity display control 55. One satisfactory type of filter is a tenth octave filter which is continuously adjustable as by a knob 56 from a frequency of 5 Hz to 50 Hz and has octave bandwidths which vary between about 2 to 5 Hz. The knob position is preferably calibrated to Doppler velocity or bandpass center frequency by a scale not shown. The variable Doppler velocity display control 55 includes a variable attenuator 57 which is adjustable by a knob 58 and through which the filtered signal is applied to a charging capacitor 59 whose value is selected to enable a display circuit time constant of a value on the order of 1 second to avoid alarm actuation by spurious signals. The signal appearing across the capacitor 59 is applied both to a meter 60 and to an adjustable threshold responsive driver 61 whose relative response level is varied by adjusting a knob 62 and which provides an output singal for activating visual alarm 63 in the display 53. The alarm activating signal from the driver 61 is also applied through an OR gate 64 to an audible alarm device 65 in the display 53. A satisfactory type of meter 60 is one which may be damped so that, in effect, it integrates the amplitudes of the frequency spectra passed by the filter 54 over a time period such as about 5 seconds. It can be seen, therefore, that by adjusting the knob 58 the attenuator 57 is controllable so that the display of the meter 60 can be adjusted to a zero reading. A satisfactory type of threshold responsive driver 61 is a meter 60 which has an indicator carried contact and includes a movable contact positioned by the knob 62 at a selected reading greater than zero which functions, when the signal amplitude applied thereto increases a sufficient degree so that an electrical connection is established between the indicator arm contact and the movable contact to apply a signal to activate both the visual alarm 63 and the audible alarm 65.

The output signal of the amplifier 43 is also applied to a bank 70 of fixed bandpass filters 71, 72, 73, 74 and 75 having respective bandpass characteristics which are down 3 db at the lower and upper ends of the following desired respective frequency ranges: 10 to 15 Hz, 15 to 20 Hz, 20 to 27 Hz, 27 to 36 Hz, and 36 to 48 Hz. The filter bandpass frequencies are selected so that for the 30 KHz frequency of the carrier signal projected by the projector 11 they correspond to the magnitude of the Doppler frequency shifts attributable to reflective targets moving relative to the transducer array 10 with the following speed ranges: one-half to three-fourths knots, three-fourths to 1 knot, 1 to 1 ⅕ knots, 1 ⅕ to 1-4/5 knots, and 1-4/5 to 2-2/5 knots.

The output signals of the filters 71–75 are applied to respective display control units 76–80, inclusive, which may be of the same type as the control 55 each including a knob 81 for adjusting the signal level of the Doppler shift spectra applied to a respective one of the meters 82–86 in the display 53. The display controls 76–80 also include adjusting means represented by knobs 87 each for adjusting the level of response of a threshold responsive driver such as 61 which provides an activating signal to a respective one of the alarms 91–95 and also to the OR gate 64 for driving the audible alarm 65.

In general, operation of the detection system of FIG. 6 is relative uncomplicated so that unskilled personnel may utilize the device. Once the projector 11 and receiver 12 have been installed in position flanking the vulnerable structure to be protected such as the piling 19 of the bridge 14 and their beam axes arranged to intersect at the selected point D upstream from the piling 19, the oscillator 30 is actuated to cause the projector 11 to continuously ensonify the guarded volume G with the 30 KHz carrier signal. The knob 44 of the amplifier 43 is adjusted in order to obtain a reading on the meter 52 near the low end of its scale. Thereafter the knobs 81 of the display control 76–80 are individually operated so that each of the meters 82–86 indicates a selected low or minimal reading. It may be necessary to increase the overall detector output signal level and thereby, the reading on the meter 52 by adjusting the knob 44 so that at least minimal readings are attained on all of the meters 82–86.

It may be desirable to adjust the position of the potentiometer wipre arm 36 to eliminate second order harmonics. This can be done by ascertaining the frequencies of the spectra of maximum amplitude as by adjusting the filter 54 while observing the meter 60 and by adjusting the position of the potentiometer wiper arm 36 while observing the appropriate one of the meters 82–86 displaying the spectra of frequencies which happen to be the second harmonic of that introduced by the stream current.

Further adjustment of the degree of attenuation by the controls 76–80 may be necessary to attain at least minimum readings by the meters 82–86. Thereafter, the threshold response levels of the controls 76–80 are first adjusted by operating each of the knobs 87 so that the alarms 91–95 are not operating during the prevailing ambient conditions and are then each adjusted so that the respective signal level increases corresponding to a selected increase such as 15–25 db actuate the alarms 91–95 and 65.

The frequencies of the band of Doppler shift spectra passed by the filter 54 are gradually increased as by turning the knob 56 so that the meter 60 displays a maximum reading. Thereafter, the frequencies are further increased until the meter displays a minimum reading. Then the frequencies are descreased so that the meter 60 displays an amplitude reading which is about half-way between the maximum and minimum readings. FOr example, referring to FIG. 5, the bandpass characteristic of the filter 54 after the above-described procedure will have been centered at about 23 to 24 Hz, the maximum reading having been observed for Doppler shift spectra of about 20 Hz, i.e., that attributable to the primary stream current. The attenuator 57 is adjusted as by the knob 58 so that the meter 60 displays a minimum reading, and the threshold responsive driver 61 is adjusted as by the knob 62 so that the alarms 63 and 65 will be activated when the Doppler shift spectra passed by the filter 54 have undergone the selected increase in amplitude.

Referring to FIG. 4, when an underwater swimmer is approaching at a speed greater than the primary stream current, Doppler shift spectra will be introduced into the reflected signals which fter filtering will be passed by the one or more of the filters 71–75 in the bank 70 and cause one or more of the alarms 91–95 tp be activated along with the audible alarm 65. Of course, the alarms 91, 92 and 93 may not be activated in the case of a primary stream current of magnitude as great as 1 knot since the primary Doppler shift spectra having amplitude increases attributable to the swimmer are in the 27 to 48 Hz range which are passed by the filters 74 and 75 to cause actuation of the alarms 94 and 95.

On the other hand, referring to FIG. 5, floating of drifting swimmers are more difficult to detect in that the amplitude increases attributable to the swimmer are observed primarily in those Doppler shift spectra introduced by the primary current. Hence the filter 54 is adjusted as described above to pass Doppler shift spectra having frequencies in the range of about 22 to 24 Hz when there is a primary current of 1 knot corresponding to 20 Hz. When the selected band of shift spectra have a marked increase in signal level, the alarms 63 and 65 will be actuated which will indicate the intrusion of a floating or drifting swimmer. Of course, the composite spectra reading displayed on the meter 52 will slightly increase as the underwater target approaches, increasing the effective target strength. Reliance only upon the overall increase of the reading display by the meter 52 is to be avoided since the meter 52 will also register ambient increases in the overall signal level, as when the surface becomes rougher or the current increases in intensity.

When the alarm 65 is actuated, the sentry who is operating the system will be alerted to refer to the readings of the meters 52, 60, and 82–86 and to note which of the alarms 63, and 91–95 are being actuated to ascertain whether the alarm signal is most probably attributable to moving or floating swimmers or to a spurious false alarm. Thereby, the invention provides a detection system of relatively low cost which may be operated by unskilled personnel to function as an aid warning of possible intrusions of underwater attackers. The apparatus does not require a complex operating procedure to ascertain the received signal content of precise signal level intensities above a precise reference level of each of a number of exact frequencies but rather utilizes the relative variations above ambient levels of a band of spectra which are varied from day to day or from hour to hour by changing conditions of current, weather, and water surface.

Obviously many modifications and variations of the present invention are possible in view of the above teaching.

What is claimed is:

1. A method of detecting the appoach of an energy reflective object moving through a body of water having a current of variable velocity comprising the steps of:
   continually ensonifying a guarded volume of water within the body of water with a single tone acoustic signal to produce a reflected interference signal;
   receiving the interference signal reflected from the guarded volume;
   processing the received interference signal both to extract a plurality of fixed groups of Doppler shift frequency spectra of successive frequencies in a plurality of contiguous bandwidths of fixed center frequencies defining in composite a predetermined range of frequency spectra corresponding to a range of Doppler velocities encompassing the variable velocity of the current and to extract a variable group of Doppler shift frequency spectra in a narrow bandwidth of selectively adjustable center frequency within the predetermined range;
   selecting for extraction a variable group of Doppler shift spectra having frequencies greater than an amplitude peaked variable group of spectra having a maximum composite signal level and having a composite group signal level under prevailing ambient conditions which is less than that of the amplitude peaked variable group; and
   detecting group signal level increases above preset threshold levels for each of the fixed and selected variable groups of spectra.

2. A method according to claim 1 wherein the step of selecting includes the steps of:
   detecting a maximum composite group signal level of a first variable group of spectra encompassing those spectra of maximum amplitude which correspond to the prevailing ambient velocity of the current;
   detecting a minimum composite group signal level of a second variable group of spectra having greater frequencies than the the first group; and
   selecting for extraction a third variable group of spectra having both frequencies and a composite group signal level intermediate those of the first and second variable groups.

3. A method according to claim 2 further comprising the step of:
   establishing the guarded volume of water remotely of a location of receiving the interference signal.

4. A method according to claim 2 further comprising the step of:
   establishing the preset threshold level for each of the fixed and the third variable groups of spectra above the composite group signal level thereof which prevails under ambient conditions.

5. A method according to claim 1 further comprising the steps of:
   positioning within the body of water and in fixed relation to a bottom boundary of the water both a narrow beam directional projector for projecting the acoustic signal and a narrow beam directional receiver for receiving the interference signal at spaced locations along a line extending transversely of the prevailing direction of the current; and
   orienting the projector and receiver to have respective beam pattern axes intersecting remotely upstream along the bisector of the projector-receiver spacing which bisector is aligned with the direction of the current, forming thereby the guarded volume.

6. A method according to claim 5 wherein the steps of positioning comprises the step of:
   spacing the projector from the receiver a distance of at least 10 feet along the line extending perpendicularly of the direction of the current.

7. A method according to claim 6 wherein said step of continually ensonifying includes the step of:
   continually ensonifying the guarded volume with a single tone acoustic signal having a frequency in the range between audible and 150 KHz.

8. Detection apparatus comprising:
   array means including projector means for ensonifying a guarded volume of water with an acoustic signal and receiver means for receiving reflections of said acoustic signal and providing a receiver output signal;
   detector means connected to said receiver means for receiving said receiver output signal and providing a detector output signal indicative of Doppler shift spectra in said receiver output signal;
   a plurality of fixed bandpass filters connected to receive said detector output signal for providing filtered output signals of respective frequency bands collectively forming a predetermined frequency range encompassing Doppler shift spectra attributable to moving acoustic signal reflective media;
   an adjustable, narrow bandpass filter connected to receive said detector output signal for providing a filtered output signal and having adjusting means for shifting its bandpass characteristics and center frequency over a predetermined range; and indicator means for indicating signal level increases in the filtered output signals of each of said adjustable bandpass filter and said fixed bandpass filters.

9. Detection apparatus according to claim 8 wherein:
said projector means includes a projector and oscillator means connected to said projector for providing thereto a continuous wave, single tone, signal for projection to ensonify the guarded volume.

10. Apparatus according to claim 8 further comprising:
circuit means connected between said oscillator means and said receiver means for continuously applying an electrical sample of said single tone signal for addition to the said electrical output signal of said receiver means.

11. Apparatus according to claim 8 wherein:
said projector means and said receiver means comprise a narrow beam directional projector and a matched narrow beam directional receiver arranged in spaced relation to form a guarded volume spaced from said projector and said receiver.

12. Apparatus according to claim 11 wherein:
said transducer and said receiver are spaced apart along a line extending transversely of a prevailing current in a guarded volume and have their beam axes orineted to intersect at an upstream point on a current-flow direction aligned bisector of the spacing between said projector and receiver.

13. Apparatus according to claim 12 wherein:
said projector means includes oscillator means providing a continuous wave, single tone signal for projection having a frequency in the range between audible and 150 KHz.

14. Apparatus according to claim 12 wherein:
said projector and said receiver each comprise a concave parabolic signal reflector and a spherical transducer fixed at the focus thereof.

15. Apparatus according to claim 12 wherein:
said projector means includes an oscillator providing a continuous wave single tone electrical signal, a coupling transformer having a primary winding connected to receive said electrical signal and having a grounded, center tapped secondary winding connected to said projector and a potentiometer having a movable wiper arm connected across said secondary winding of said coupling transformer; and
said apparatus further comprises circuit means for applying the electrical signal appearing at said wiper arm to said receiver means for addition to said receiver output signal.

16. Apparatus according to claim 12 further comprising:
variable gain amplifier means for amplifying said detector output signal applied to said filters including an automatic gain control loop for adjusting the gain of said amplifier to compensate for changes in the prevailing signal level of the detector output signal gradually occurring over a period of at least ten minutes.

17. Apparatus according to claim 12 wherein said display means comprises:
a plurality of control means each including an input attenuator having adjusting means and being connected to receive said filtered output signal from a respective one of said fixed and adjustable filters for providing a respective filtered attenuated signal each said control means further including threshold responsive alarm driving means connected to receive said filtered attenuated signal for providing an alarm signal;
a plurality of meter means each connected to receive a respective said filtered attenuated signal; and
a plurality of indicator means each connected to said control means for receiving a respective alarm signal and being responsive thereto for indicating that said filtered attenuated signal exceeds a threshold level.

18. Apparatus according to claim 17 wherein said plurality of said indicator means further comprises:
a plurality of visual alarms each connected to a respective alarm driving means to receive said alarm signal for providing a visual indication;
OR gate means connected to each of said alarm driving means for receiving said alarm signals and providing an OR gate output signal; and
audible alarm means connected to receive said OR gate output signal for emitting an audible alarm.

19. Apparatus according to claim 18 further comrpising:
a resistor connected at one end to receive the output signal of said detector means;
a charging capacitor connected to the other end of said resistor for integrating said signal over a period of at least 1 second; and
a meter connected to said charging capacitor for indicating the level of the signal appearing across said capacitor.

* * * * *

UNITED STATES PATENT OFFICE
CERTIFICATE OF CORRECTION

Patent No. 3,740,704      Dated September 12, 1973

Inventor(s) Henry Suter

It is certified that error appears in the above-identified patent and that said Letters Patent are hereby corrected as shown below:

Column 11, Claim 10, line 9, "Apparatus according to claim 8 further compris-" should read --Apparatus according to claim 9 compris- --.

Column 11, Claim 12, line 26, "axes orineted to intersect at an upstream point on" should read --axes oriented to intersect at an upstream point on--.

Signed and sealed this 18th day of December 1973.

(SEAL)
Attest:

EDWARD M. FLETCHER, JR.       RENE D. TEGTMEYER
Attesting Officer      Acting Commissioner of Patents